S. H. PATTERSON.
INSECT CATCHER.
APPLICATION FILED JULY 14, 1915.
1,178,261. Patented Apr. 4, 1916.
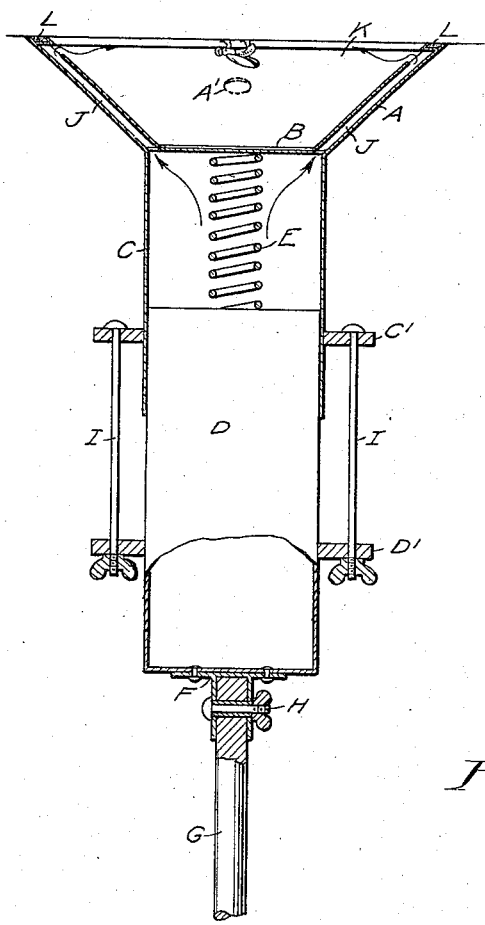
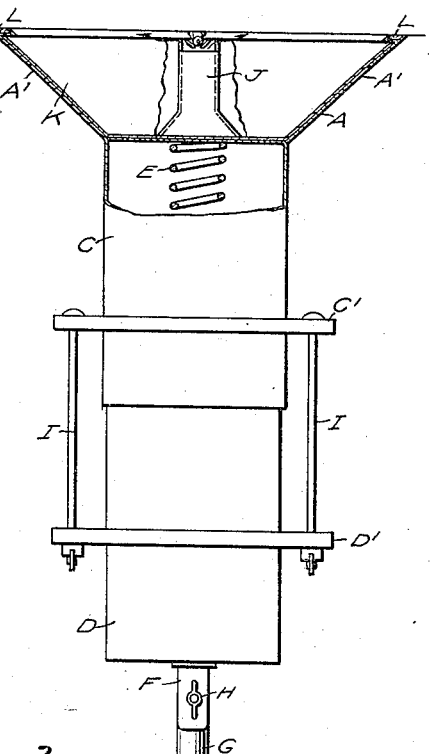
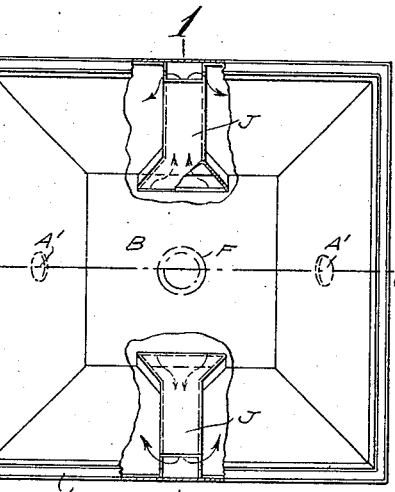
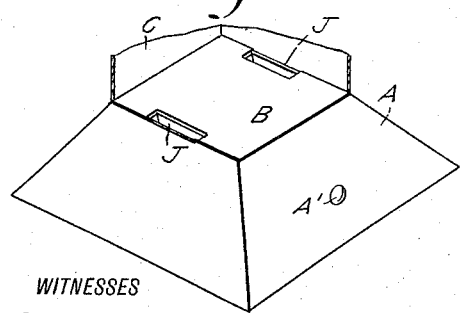
WITNESSES
INVENTOR
S. H. Patterson
BY
ATTORNEYS

UNITED STATES PATENT OFFICE.

SAMUEL H. PATTERSON, OF PHILADELPHIA, PENNSYLVANIA.

INSECT-CATCHER.

1,178,261.     Specification of Letters Patent.     Patented Apr. 4, 1916.

Application filed July 14, 1915. Serial No. 39,825.

*To all whom it may concern:*

Be it known that I, SAMUEL H. PATTERSON, a citizen of the United States, and a resident of Philadelphia, in the county of Philadelphia and State of Pennsylvania, have invented a new and Improved Insect-Catcher, of which the following is a full, clear, and exact description.

The object of the invention is to provide a new and improved insect catcher, more especially designed for use in houses for catching flies, mosquitos and other insects while at rest on a ceiling, wall or other support.

In order to accomplish the desired result, use is made of a funnel provided with a barrel and having an air channel leading from the barrel to the edge of the funnel, and a handled plunger movable in the said barrel for forcing an air blast through the air channel to dislodge an insect on a ceiling, wall or other support, and against which the finger is pressed.

A practical embodiment of the invention is represented in the accompanying drawings forming a part of this specification, in which similar characters of reference indicate corresponding parts in all the views.

Figure 1 is a cross section of the insect catcher on the line 1—1 of Fig. 3; Fig. 2 is a sectional side elevation of the same on the line 2—2 of Fig. 3 and with the parts shown in elevation; Fig. 3 is a plan view of the same with parts of the flypaper broken out; and Fig. 4 is a perspective view of the inverted funnel for holding the flypaper or similar retaining means.

A funnel A is provided at its closed bottom B with a barrel C in which is mounted to reciprocate a plunger D pressed on by a spring E interposed between the top of the plunger D and the bottom B of the funnel A. The lower end of the plunger D is provided with a bracket F on which is fastened a handle G by the use of a clamping bolt H which serves as a pivot for holding the handle G in axial alinement with the plunger D or at an angle thereto. The barrel C is provided with lugs C' and similar lugs D' are arranged on the lower end of the plunger D, and sliding rods I connect the lugs C' and D' with each other to limit the downward movement of the plunger D in the barrel C, but to allow the plunger D to move upward in the barrel when using the insect catcher, as hereinafter more fully explained.

The funnel A is provided on two opposite walls with air channels J each connected at its lower end with the upper end of the barrel C and each opening near its upper end into the funnel adjacent the top edge thereof. Thus when the funnel A rests against a ceiling, wall or other support, and the operator pushes the handle G upward then the plunger D moves in the barrel C and forces the air therein through the air channels J into the funnel A to dislodge a mosquito, fly or other insect resting at the time on the support. The dislodged insect eventually comes in contact with the flypaper or other sticky material removably held on the inside of the funnel A. The upper edge of the funnel A is preferably provided with a rubber cushion L to prevent marring of the wall paper or other covering on the ceiling, wall or other support against which the funnel is pressed. The funnel A is provided on opposite sides with holes A' to permit of passing the fingers through for loosening the flypaper whenever it is desired to remove the same from the funnel or replace it by fresh flypaper. The handle G is extended axially relatively to the plunger D when using the device for catching insects resting on a ceiling, but for catching insects on a wall the handle G can be lifted into an angular position relatively to the plunger.

It is understood that in using the insect catcher, the operator places the mouth of the funnel A over the insect until the cushion L rests on the support and then the operator on pushing the handle G causes the plunger D to send an air blast through the channels J and against the support to dislodge the insect and cause the same to pass onto the flypaper held on the funnel A.

A large number of insects can be caught with the insect catcher before it is necessary to replace the flypaper by a fresh one.

The channels J may be on the inside or on the outside of the pan A.

Having thus described my invention, I claim as new and desire to secure by Letters Patent:

1. An insect catcher, comprising a funnel provided with a barrel and having an air channel leading from the barrel to the edge of the funnel, and a handled plunger movable in the said barrel for forcing an air blast through the air channel for dislodging an insect.

2. An insect catcher, comprising a funnel adapted to contain flypaper and having air channels on opposite sides, a barrel on the said funnel and connected with the said channels, and a spring-pressed plunger movable in the said barrel.

3. An insect catcher, comprising a funnel adapted to contain flypaper and having air channels on opposite sides, a barrel on the said funnel and connected with the said channels, a spring-pressed plunger movable in the said barrel, a handle, and means for adjustably attaching the handle to the plunger.

In testimony whereof I have signed my name to this specification in the presence of two subscribing witnesses.

SAMUEL H. PATTERSON.

Witnesses:
H. H. FUNK,
GEO. STERNER.

Copies of this patent may be obtained for five cents each, by addressing the "Commissioner of Patents, Washington, D. C."